Figure 1:
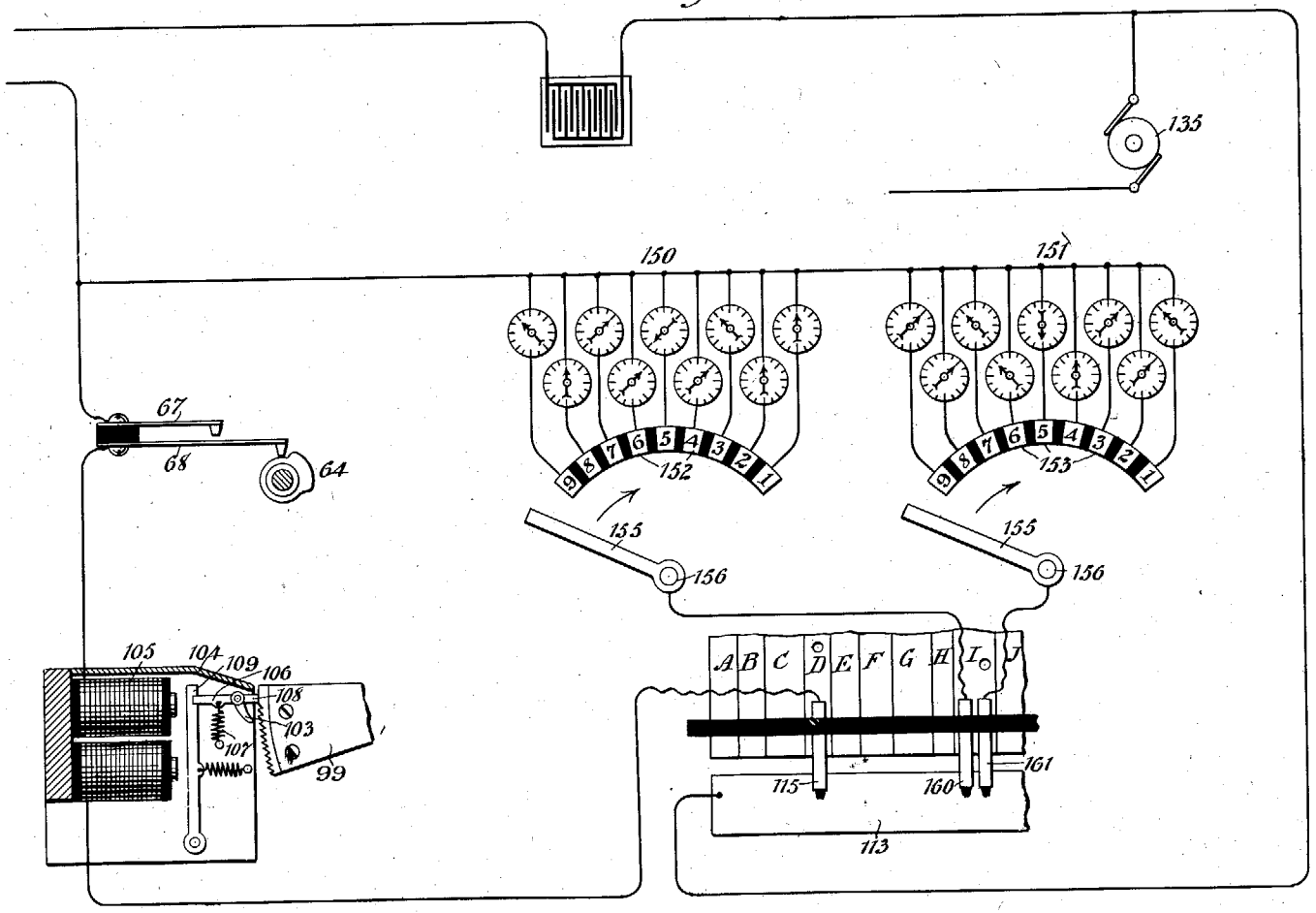

No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 1.

Witnesses
Conrad Liebl
William Wittstein

Inventor
Herman Hollerith
By his Attorney
J. Mulcaster

No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 2.

Witnesses
Conrad Liebl
William Wittstein

Inventor
Herman Hollerith
By his Attorney
J. G. Metcalf

No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 3.

Witnesses
Conrad Liebl
William Wettstein

Inventor
Herman Hollerith
By his Attorney F. J. Metcalf

No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 4.

Witnesses
Conrad Liebel
William Pettstein

Inventor
Herman Hollerith
By his Attorney F. Metcalf

No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 5.

Witnesses
Conrad Diehl
William Kettstein.

Inventor
Herman Hollerith
By his Attorney
J. Metcalf

No. 12,523. REISSUED AUG. 28, 1906.
H. HOLLERITH.
APPARATUS FOR USE IN TABULATING SYSTEMS.
APPLICATION FILED JULY 25, 1906.
8 SHEETS—SHEET 6.
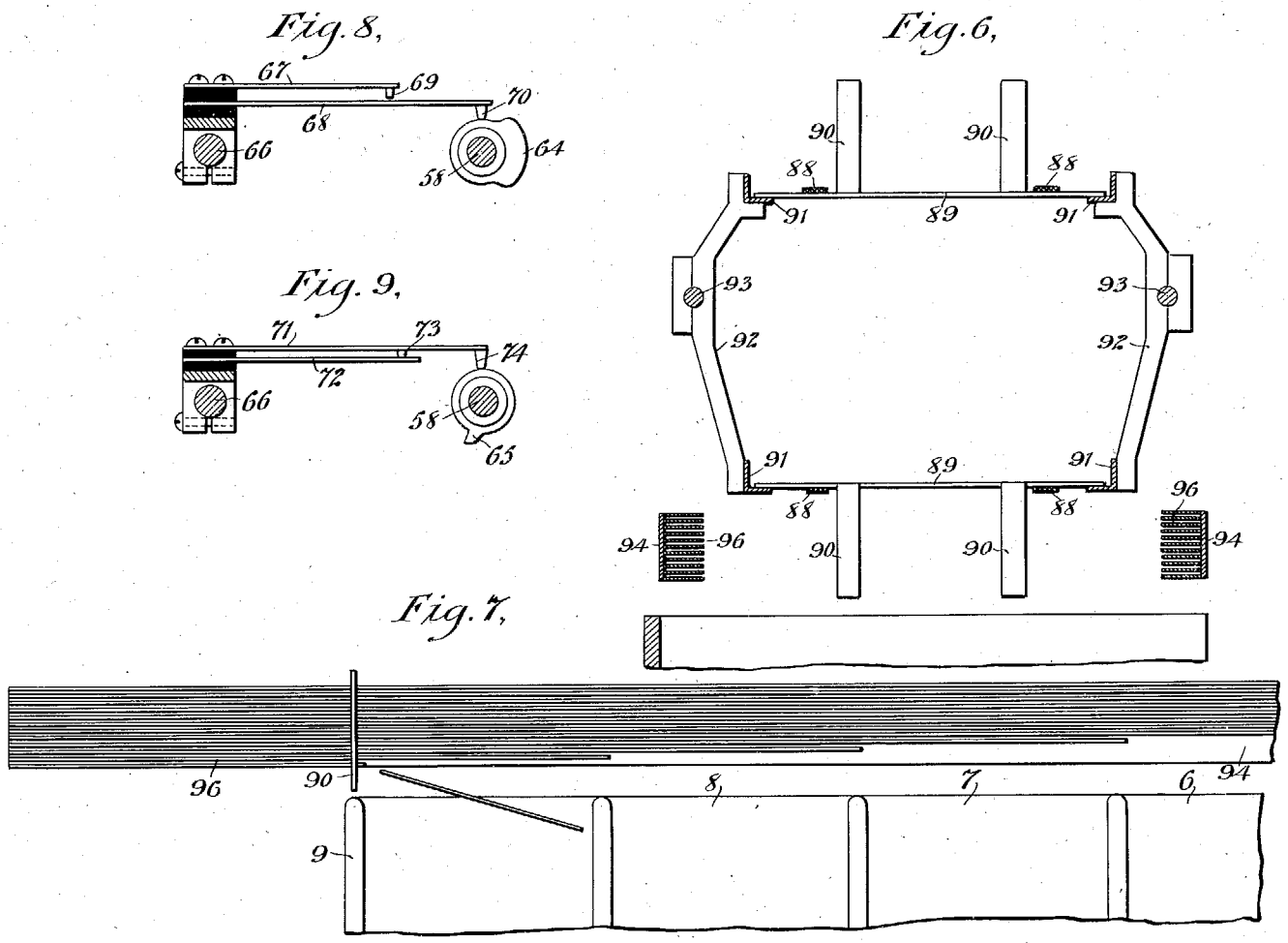
Witnesses
Conrad Diehl
William Wattstein
Inventor
Herman Hollerith
By his Attorney
F. G. Metcalf No. 12,523. REISSUED AUG. 28, 1906.
H. HOLLERITH.
APPARATUS FOR USE IN TABULATING SYSTEMS.
APPLICATION FILED JULY 25, 1906.
8 SHEETS—SHEET 7.
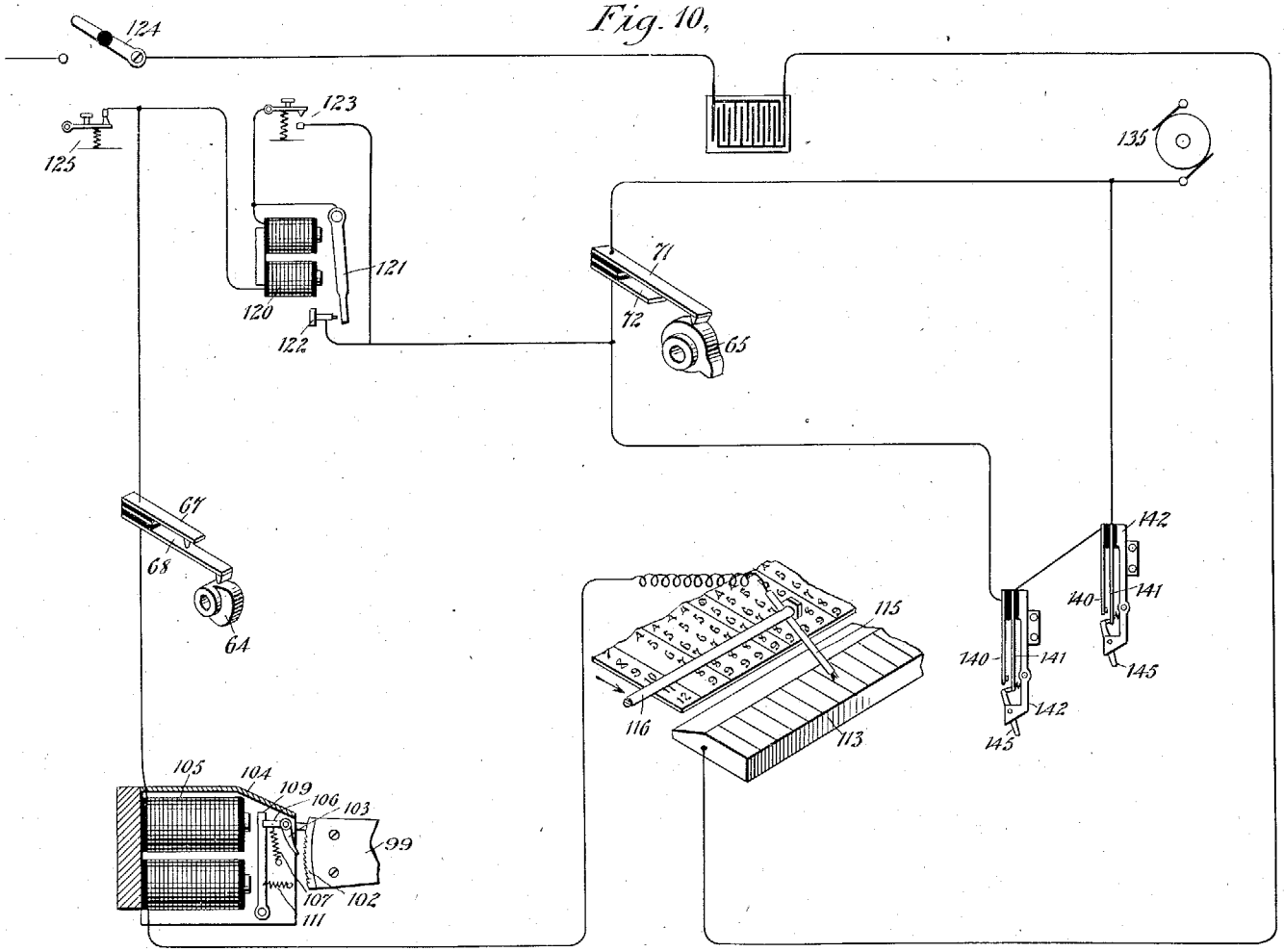
Witnesses
Conrad Diehl
William Wattstein.
Inventor
Herman Hollerith
By his Attorney
H. Mellaff No. 12,523. REISSUED AUG. 28, 1906.

H. HOLLERITH.

APPARATUS FOR USE IN TABULATING SYSTEMS.

APPLICATION FILED JULY 25, 1906.

8 SHEETS—SHEET 8.

Witnesses
Conrad Liebl
William Wittstein.

Inventor
Herman Hollerith
By his Attorney J. Lynch Taylor

UNITED STATES PATENT OFFICE.

HERMAN HOLLERITH, OF GARRETT PARK, MARYLAND, ASSIGNOR, BY MESNE ASSIGNMENTS, TO THE TABULATING MACHINE COMPANY, A CORPORATION OF NEW JERSEY.

APPARATUS FOR USE IN TABULATING SYSTEMS.

No. 12,523. Specification of Reissued Letters Patent. Reissued Aug. 28, 1906.

Original No. 777,209, dated December 13, 1904. Application for reissue filed July 25, 1906. Serial No. 327,789.

*To all whom it may concern:*

Be it known that I, HERMAN HOLLERITH, a citizen of the United States, residing in Garrett Park, Montgomery county, Maryland, have invented certain new and useful Improvements in Apparatus for Use in Tabulating Systems, of which the following is a full, clear, and exact description, reference being had to the accompanying drawings, forming part of this specification.

The object of this invention is primarily to provide means and apparatus for use in the Hollerith tabulating system by which the records employed in that system may be tabulated and the results thereof counted or compiled by a suitable register or series of registers and by which the records may be classified.

The records employed in the Hollerith system consist, preferably, of separate cards upon which index-points are formed by punching holes through the cards, the value or character of the item thus recorded being denoted by the position of the index-point. In the most efficient form in which the system has been developed the index-points on the cards control electric circuits which are closed through the holes when the records are in operative position; but it is to be understood that my invention is not limited to use in any particular system or with any particular classes of records or to any special arrangement of or means of forming the index-points or to the employment of an electric circuit or circuits.

With this general reference to the character of my invention I will now proceed to describe a preferred form of apparatus which embodies the features thereof and the operation of which, as it has been used successfully for that purpose, I will explain in connection with the tabulation and sorting of records containing data relating to the transportation of freight. I will not attempt to describe in detail the complete method of tabulating freight statistics or the numerous classifications of the records that are effected in that work and will refer to only so much thereof as will be necessary to explain the construction and operation of the apparatus illustrated.

Figure 11:
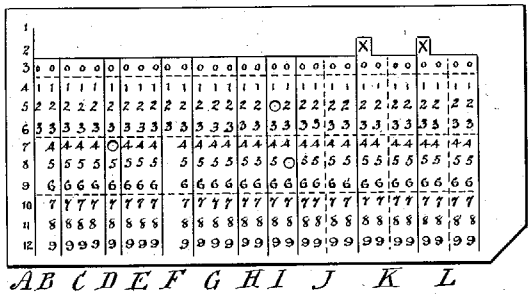

A typical record arranged for use in the compilation of freight-transportation statistics is shown in Fig. 11. Each such record or "record-card," as I have herein termed it, represents a way-bill, and when properly punched contains all the information relating to each consignment which it is desired to tabulate. The record shown, which is about half-size, is provided with twelve groups or divisions of index-point positions, which provide for the designation of (A) the month and (B) the day of shipment, (C) the receiving-station, (D) the line by which the shipment was made, (E) the forwarding-station, (F) the forwarding date, (G) the way-bill number, (H) the commodity, (I) the weight, (J) the proportional charge, (K) advances, and (L) prepaid charges. The index-point positions are denoted by numerals printed in columns on the cards, and each group comprises one or more columns, as required. Taking groups D and I as examples, each road or section of road over which the shipment may be made is represented by a number. To designate the road, the corresponding numeral is punched in group D, while the weight of each shipment up to ninety-nine pounds may be designated in group I by punching the corresponding numerals therein. For the sake of brevity I have shown only two columns, the right-hand column representing units and the left-hand tens. In practice a greater number of columns is generally employed to provide for shipments weighing more than ninety-nine pounds. In tabulating the records the totals of weight and values are compiled or counted by suitable registering devices—for instance, like those shown in United States Letters Patent No. 395,781, granted to me January 8, 1889—and either in connection with such tabulation or by a distinct operation the cards, in order to obtain a proper subdivision of the data, are sorted into groups according to the data on the cards. Thus it may be desired to obtain the total weight of shipments for a certain period and at the same time to sort or classify the records relating to these shipments according to the road or section of road over which the shipments were made. This may be accomplished by the particular form of apparatus illustrated in the accompanying drawings, in which—

Figure 2:
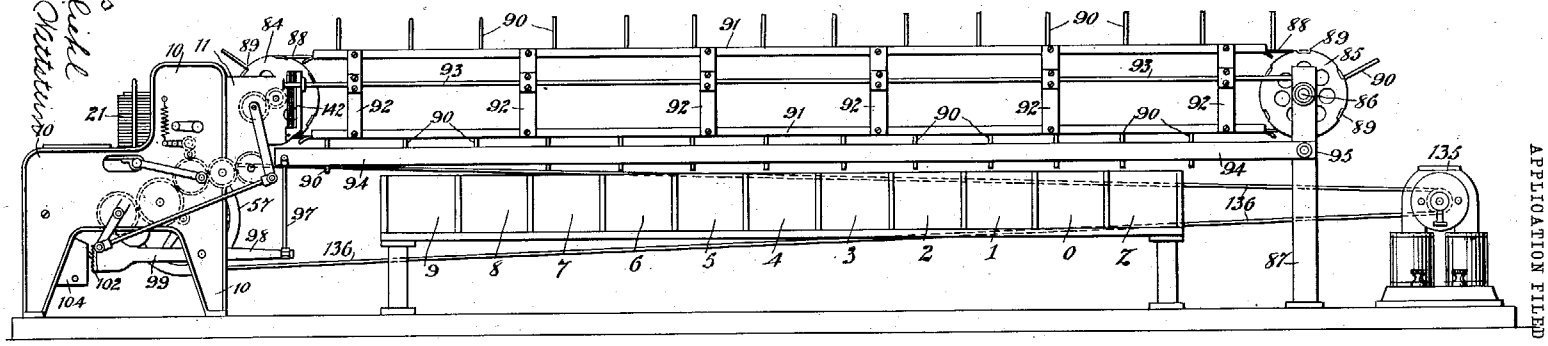
Figure 3:
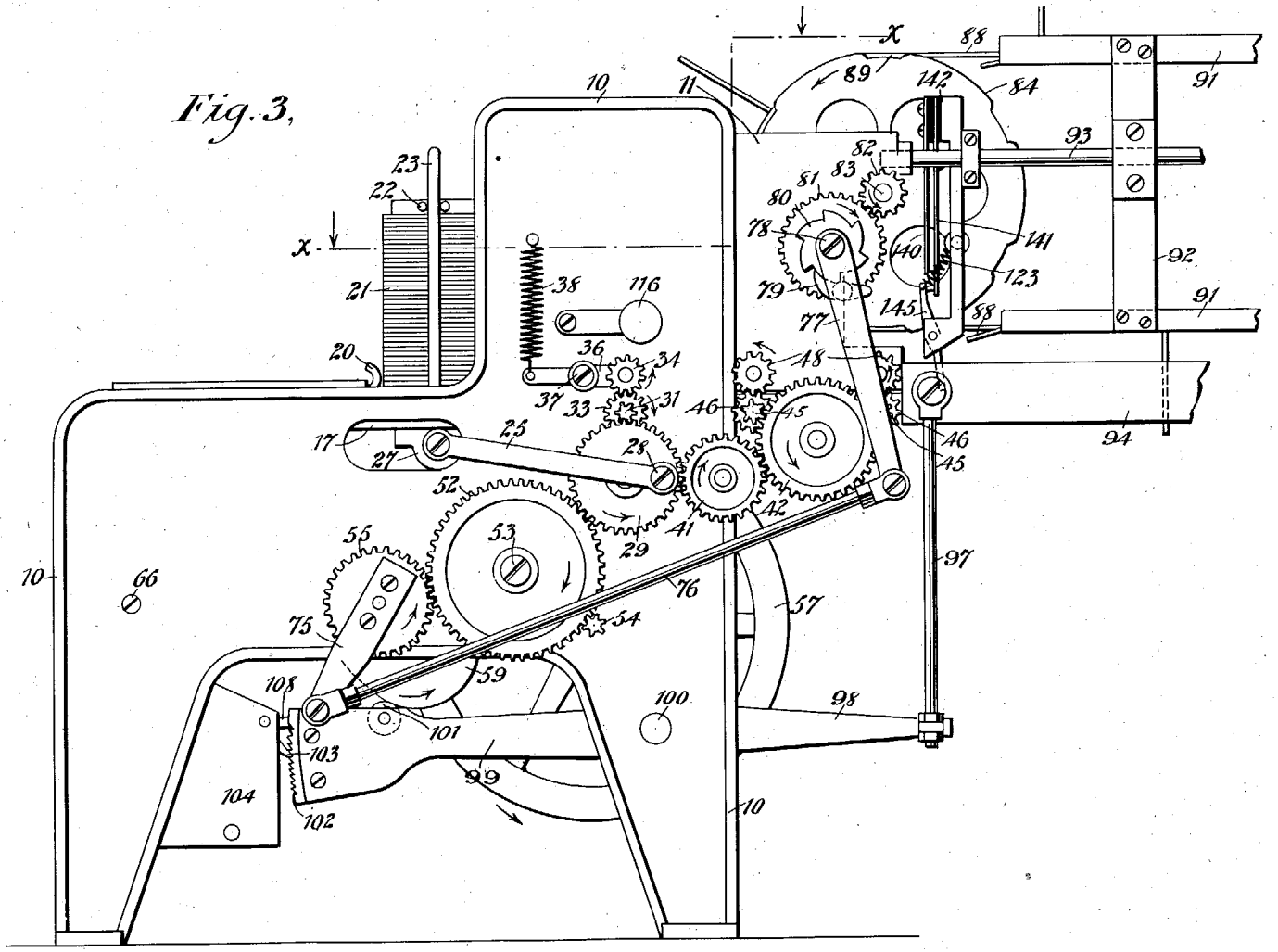
Figure 4:
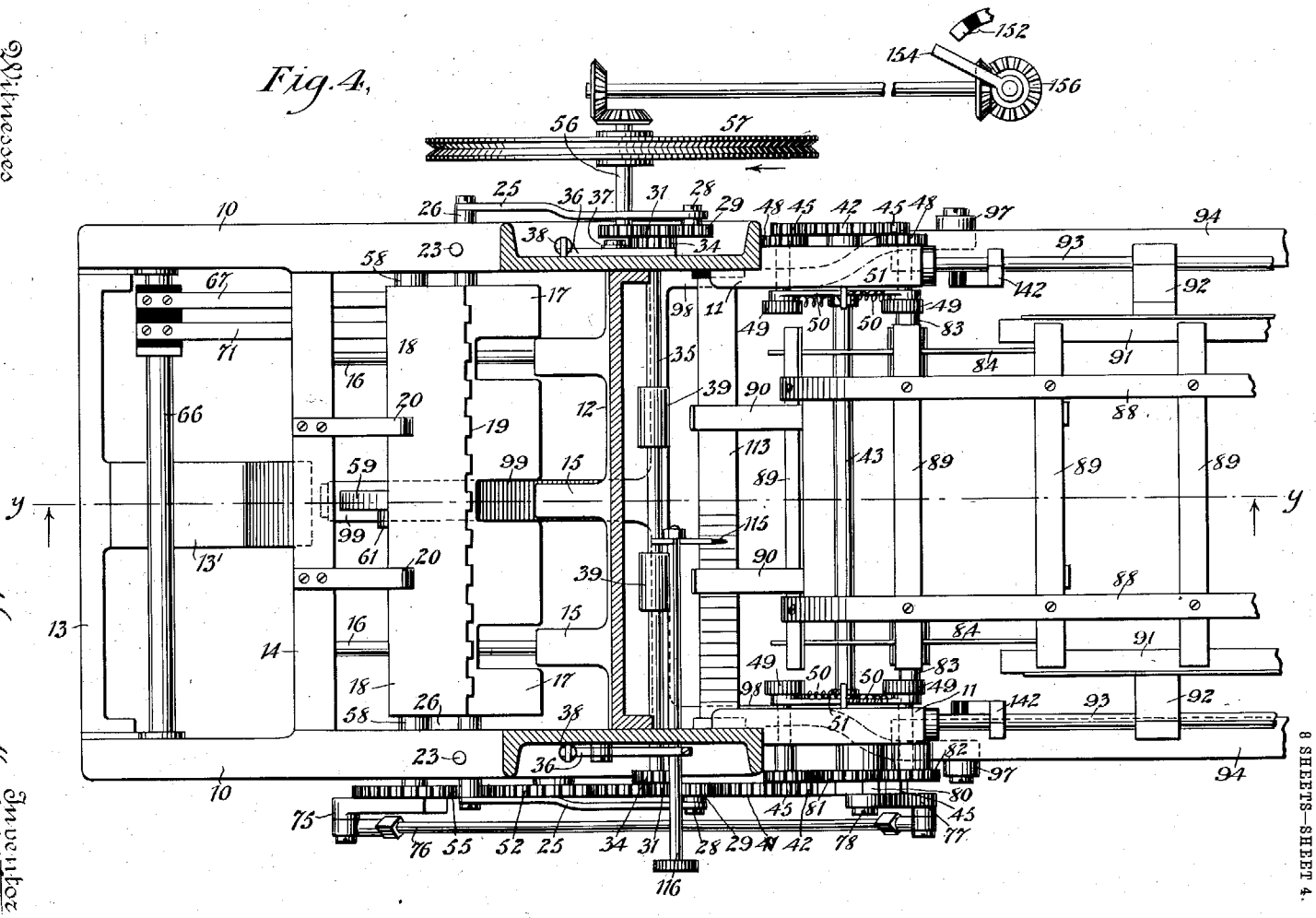

Figure 1 is a diagrammatic view of the electric circuits and devices employed in the registering apparatus. Fig. 2 is a side elevation of a record-sorting apparatus; Fig. 3, a side elevation, on a larger scale, of the part shown in Fig. 1 at the left of the drawings; Fig. 4, a sectional plan of the mechanism shown in Fig. 2 on and below the plane *x x;* Fig. 5, a sectional elevation thereof on the plane *y y;* Fig. 4, viewed in the direction indicated by the arrows; Fig. 6, a sectional detail on the plane *z z,* Fig. 5, viewed in the direction indicated by the arrows; Fig. 7, a detail illustrating the construction and operation of certain devices by means of which the cards are conveyed to and deposited in separate groups; Fig. 8, a detail of a circuit-controlling device; Fig. 9, a detail of another device of a similar character; Fig. 10, a diagrammatic view of electrical circuits and connections by which the sorting devices are operated; Fig. 11, a view of a record-card, and Fig. 12 a diagrammatic view showing a modified form of counters or registers.

Similar reference characters designate like parts in all views.

Referring first to the sorting apparatus, it will be understood that the cards may be sorted or classified under any of the first eight groups shown on the card illustrated in Fig. 11, and I will therefore describe the operation of the machine in sorting the cards according to the line or road of shipment, the data being embodied in group D of the record-card.

The cards having been properly punched are piled upon a suitable platform and fed one by one into position to effect the operation of circuit-controlling devices which variably govern the action of mechanism according to the location of the index-point of each card to deposit the record in its proper group. The groups are formed by depositing the cards at different points or sorting-stations, and for the purpose of preserving the classification effected by the machine a separate box or compartment is preferably employed to receive each group. These compartments are designated, Fig. 2, by the letter "Z" and the numerals "0" to "9," inclusive.

Figure 5:
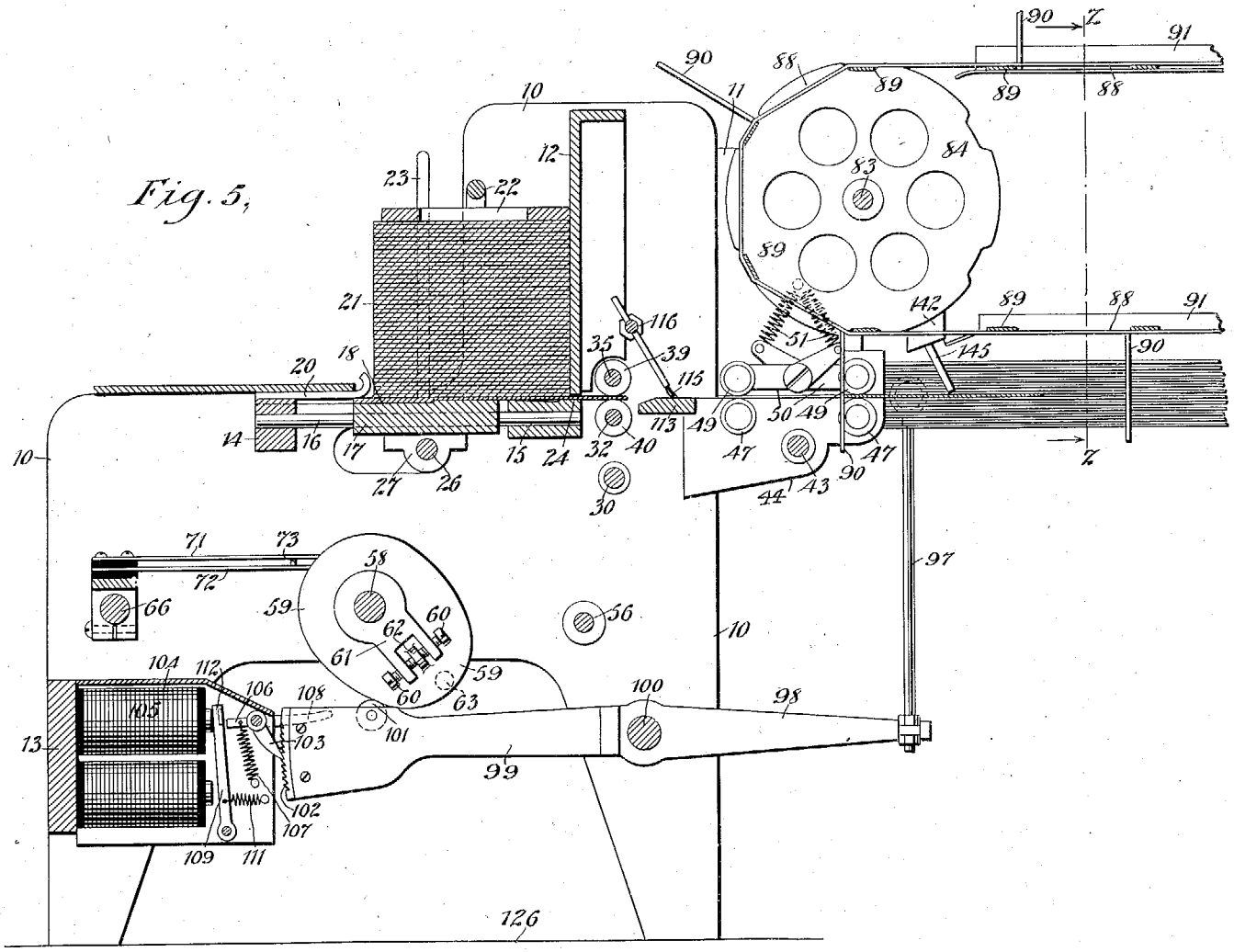

The frame of the feeding mechanism is composed of standards 10, having extensions 11, and is secured together by cross-beams 12, 13, and 14. Under the cross-beam 12 is a fixed bar on which are blocks 15, that project in front of the cross-beam. Guides consisting of rods 16 are fixed in two of these blocks and in the cross-beam 14 to support the reciprocating cross-head 17. The upper faces of the cross-head 17 and the block 15 are in the same horizontal plane. The blocks 15 and cross-head 17 form the platform on which the cards to be sorted are piled. On the cross-head 17 is a plate 18, whose upper surface is slightly higher than the card-platform. The inner or rear edge 19 of this plate is indented, as appears clearly in Fig. 4. A pair of stationary guide-fingers 20, attached to the cross-beam 14, project thence over the plate 18, the inner ends of these fingers being turned upward, as shown in Fig. 5, and being at a distance slightly greater than the width of the cards from the front face of the cross-beam 12. The cross-head 17 is movable from the position indicated in Figs. 4 and 5 toward the cross-beam 14 far enough to carry the indented edge 19 of the plate 18 even with or under the curved ends of the fingers 20. The pile of cards 21 is laid against the beam 12, and on the pile is put a plate or keeper 22, which fits between the standards 10, and in whose lateral edges are pins which embrace the guide-rods 23, fixed in the standards. Between the cross-beam 12 and the bar supporting the blocks 15 is a passage 24, of the proper height to allow only the bottom card of the pile to pass under the cross-beam. The movement of the cross-head 17 from the cross-beam 14 to the position shown in Fig. 5 is sufficient to cause the raised edge 19 of the plate 18 to push the card through the passage 24 far enough to be engaged by the feed-rolls hereinafter described. This motion is imparted to the cross-head 17 by connecting-rods 25, secured to a rod 26, extending through brackets 27 on the cross-head 17 and through openings in the standards 10. The wrist-pins 28 of the connecting-rods are fixed in gears 29, fast on a shaft 30, that extends through and has bearings in the standards. These gears mesh with pinions 31, fast on a shaft 32, extending through bearings on the standards. On the shaft 32, between each of the pinions and the adjacent standard, is a small gear 33. These gears 33 are fast on the shaft 32, and they mesh with similar gears 34, fast on a shaft 35, which extends through holes in the standards and has bearings in arms 36, pivoted to the standards by pins 37, the holes in the standards being large enough to allow the shaft 35 to play up and down. Springs 38, attached to the arms 36, subject the shaft to a yielding downward pressure. Feed-rolls 39 are fixed on the shaft 35, and directly under these rolls are other similar feed-rolls fixed on the shaft 32, one of the latter feed-rolls 40 being shown in Fig. 3. Behind the gear 29, on the side of the frame which is shown in Fig. 3, is an idle gear 41, mounted on a stud fixed in the standard and meshing with the gears 29 and 42. The gear 42 and another similar gear at the other side of the machine are fast on a shaft 43, having bearings in fixed brackets 44, projecting from the standards. The gears 42 mesh with pinions 45, which are fast on studs having bearings in the brackets 44 and carrying also small gears 46 outside of the brackets and feed-rolls 47 inside of the brackets. The gears 46 mesh with similar gears 48, which actuate the feed-rolls 49, these gears and feed-rolls being carried by the pivoted arms 50. A yielding downward pressure is imposed on the feed-rolls 49 by coil-springs 51, connected with the arms 50. The feed-rolls 47, which are in line with the rolls 40, are arranged to revolve at a higher rate of speed than the rolls 40 in order to facilitate the feeding of the cards. An idle gear 52, which meshes with the gear 29 on that side of the frame which is shown in Fig. 3, is mounted on a stud 53, fixed in the standard. This idle gear also meshes with a pinion 54 and a gear 55. The pinion 54 is fast on a driving-shaft 56, on which is a fast pulley 57 on the other side of the machine. The gear 55 is fast on a shaft 58, having bearings on the standards. On this shaft midway between the standards is a cam 59, which is rendered adjustable to exactly its proper position on the shaft by means of set-screws 60, inserted in a forked block 61 and bearing against a projection 62 on one side of the cam, as appears by Fig. 5, the forked block being fast on the shaft. In the cam is a pin 63. (Indicated by dotted lines in Fig. 5.) On the shaft 58 are two other cams 64 and 65, which actuate the circuit-controlling devices. (Separately shown in Figs. 8 and 9.) These devices are attached to a rod 66, fastened at its ends to the standards and project from this rod over the cams 64 and 65, as appears by Figs. 4, 5, 8, and 9. The device shown in Fig. 8 comprises upper and lower insulated spring-conductors 67 and 68, having on their under sides projections 69 and 70, respectively. The projection 70 is always in contact with the cam 64, and when it is in the position shown in Fig. 8 the projection 69 is not in contact with the conductor 68. During each revolution of the cam the projection 70 is raised by the action of the cam upon it, and contact of the conductor 68 with the projection 69 is established and maintained for a suitable interval, after which it is broken and remains broken until it is again established by the cam, as described. The device shown in Fig. 9 comprises upper and lower insulated spring-conductors 71 and 72, the upper conductor having on its under side projections 73 and 74. These projections are in contact with the strip 72 and the cam 65, respectively, except when the contact of the projection 73 with the strip 72 is broken by the lifting action of the cam on the projection 74. This contact is instantly reëstablished by the resilient action of the strip 71 when the projection 74 is allowed to descend from its elevated position. The cams 59, 64, and 65 are all arranged to make a complete revolution for one complete reciprocation back and forth of the cross-head 17.

To a crank 75, affixed to the gear 55, is secured a connecting-rod 76, which is pivotally attached to a pawl-carrying lever 77, secured to one of the extensions 11 of the frame by a pin 78 passing loosely through the lever. The pawl 79 on the lever engages with a ratchet 80, fastened to a gear 81, which meshes with a gear 82, fast on a shaft 83, having bearings on the extensions 11 of the frame. Sprocket-wheels 84 and 85 are mounted on shafts 83 and 86, respectively, Fig. 2, (the latter being journaled in posts 87,) and actuate a traveling card-engaging device comprising endless flexible bands 88, to which are attached slats 89, the ends of which engage with the sprockets 84 and 85, as appears by Figs. 2, 4, and 5. To these slats at regular intervals are attached fingers 90, which extend outward from the slats between the bands. The carrier is supported between the wheels 84 and 85 by angle-rails 91, Fig. 6, on which the slats slide, the angle-rails being fastened to brackets 92, through which extend rods 93, fixed in the posts 87, and the extensions 11 of the frame. The carrier is driven intermittently or step by step through the shaft 83, gears 82 81, pawl and ratchet 79 and 80, levers and connections 75, 76, and 77 from the gear 55.

The guides by which the cards are conducted to the different sorting stations or compartments consist of two plates 94, pivoted one on each side of the apparatus to the posts 87. The plates are each provided with a series of independent channels 96 of successively-increasing length, one above the other, of sufficient depth and width to receive and support the ends of the cards, the distance between the plates 94 being slightly greater than the length of the cards, and they are held in parallelism at one end by the posts 87 and at the other by the pivotally-connected rods 97, which are also connected with the arms 98 of the bifurcated lever 99. The lever 99 is pivotally mounted on the shaft 100 between the standards 10, and near the left-hand end of the lever is mounted a friction-roller 101, which engages with the cam 59, being held in contact therewith by the weight of the guides 96 and their connected parts. The guides 96, which in the particular embodiment of my invention herein illustrated are immovable relatively to each other, are by the joint action of the cam on the lever 99 and the weight of the guides reciprocated across or partly across the path of movement of the cards at each revolution of the cam, which is arranged to revolve once for each complete reciprocation of the cross-head 17. One channel or guide is provided for each sorting station or compartment, the lowest one terminating at the station nearest the operative position of the card, the next one at the next compartment, and so on, successively, as will be seen by reference to Fig. 7, so that as a card is carried through one of the guides it will fall into the compartment at which that guide terminates. Upon the front end of the lever 99 is a series of ratchet-teeth 102, one for each card-guide, and a pawl 103 is pivoted in the housing 104 of the magnet 105. The pawl 103 is provided with an arm 106, to which is attached a coil-spring 107, and with an arm 108, which lies in the path of the pin 63 on the cam 59. The magnet 105 and its housing are carried by the cross-beam 13. The spring-retracted pivoted armature 109 of the magnet is notched at 112 to receive and hold the end of the arm 106. The parts just described are so adjusted relatively to each other that when the uppermost of the guides 96 which comunicates with the station or compartment Z is exactly in position to receive a card from the delivery-rolls, the lowermost of the ratchet-teeth 102 will be in position to be engaged by the pawl 103.

The particular embodiment of my invention which I have selected for description and illustration is adapted and arranged for electrical operation. The electrical features comprise a circuit controlled by the record-card, which includes two separable contacts, one of which is the insulated conducting-plate 113, supported by the standards 10. The cards pass across this plate on their way from the pile 21 to the guides 96. Preferably this plate is graduated by lines to correspond with the division or group of the cards. The other contact consists of a conducting-brush 115, suitably connected to the circuit and secured to an insulating-rod 116, so as to normally contact with that division of the plate 113 to which it may be adjusted. These contacts are separated and this circuit is broken at this point when a card is inserted between them, and it is closed when the card is removed or when a hole in the card permits the resilient brush 115 to contact with the plate 113. This card-controlled circuit includes the coils of the magnet 105 and the spring-contacts 67 and 68, which are actuated by the cam 64. In parallel relation with the record-controlled circuit is a circuit which I term the "motor-circuit" and which includes the starting relay-magnet 120, the contact-springs 71 and 72, which are controlled by the cam 65, and an electromotor 135, by which the apparatus is operated. A branch circuit is also provided around the contact-springs 71 and 72, which includes the normally separated spring-contacts 140 and 141. The armature 121 of the relay-magnet 120 is arranged to make and break the motor-circuit at the contact 122, and a normally open branch circuit, which includes the switch 123, is arranged around the contact 122. A main switch 124 is provided at any convenient point in the line. The driving-pulley of the motor 135 is connected by a belt 136 with the pulley 57 on the shaft 56. A normally closed switch-key 125 is provided at any convenient point in the machine by which the circuit can be instantly opened and the machine stopped.

I will now describe as a separate operation the sorting of cards by the apparatus according to the line or road by which the shipments were made, the index-point positions for which are in the fourth column or group on the card, and afterward as a distinct operation the tabulation of certain data on the cards, and I may mention at this point that as certain groups on the cards contain a plurality of columns it is necessary with the particular form of apparatus shown to sort the cards for such groups separately for each column, as will be readily understood.

The punched cards are placed all the same way in a pile 21 upon the blocks 15 and 17, constituting the card-platform. The brush 115 is then adjusted in position to contact with the subdivision on the plate 113, which corresponds to this fourth column of the card. The main switch 124 being closed, the key-switch 123 is closed to energize the magnet 120, which attracts its armature to the contact 122 and holds it there, closing the circuit through the motor and starting the apparatus. This causes the reciprocation of the cross-head 17 through the gears 54 53 29 and connecting-rods 25, and the edge of the plate 18, engaging the edge of the bottom card in the pile 21, forces it through the slot 24 into engagement with the feeding-rollers 39 and 40, by which it is fed across the plate 113 between it and the brush 115 and into engagement with the rollers 47 and 49. As the card reaches the position in which the hole which may have been punched in the column or group D comes under the resilient brush 115 the latter will contact with the plate 113 underneath and close at that point the circuit which includes the coils of magnet 105. Simultaneously with the separation of the brush 115 and plate 113 by the advancing card this circuit is closed between the contact-springs 67 and 68 by the cam 64, which is so adjusted that the spring 68 is then lifted into contact with the spring 67 and is held there until the card is about to pass from under the brush. The object of this is to prevent the closing of the magnet-circuit and consequent action of the magnet when the spaces between the moving cards permit the brush to contact with the plate. Before the advancing card has reached the brush 115 the revolving cam 59 will have depressed the end of the lever 99, with which it engages, to its lowest point. As the card advances to bring the index-point position denoted by the numeral "9" under the brush 115 the lowermost of the guides 96 will be exactly in line with the moving card and the top one of the ratchet-teeth 102 will be slightly below the engaging end of the pawl 103. As the card advances the guides will descend and the ratchet will ascend proportionally, so that when the numeral "8" reaches the brush the second guide will be in line with the card and the second tooth just below the pawl 103, and so on until the numeral "4" (which it is assumed is the index-point punched in the card now under consideration) reaches its operative position under the brush. When this occurs, as before stated, the magnet-circuit will be closed through the hole in the card and its armature attracted, releasing the pawl 103, which will instantly engage the sixth ratchet-tooth from the top, arresting the upward movement of the lever 99, and holding the sixth guide in line with the card. The two sets of feed-rolls 47 and 49 engaging the card will advance it toward said guide, and while still under the control of the rolls one pair of the intermittently-actuated traveling fingers 90 will engage the rear edge of the card and carry it through the guide until it reaches the end thereof, when it will drop from the guide into the compartment at which the guide terminates and which in the operation just described will be the compartment numbered 4. When the upward movement of the ratchet end of the lever is arrested, the cam 59 continues to revolve and when the lever is arrested in an intermediate position, as shown, the decreasing radius of the cam-surface will cause it to leave the roller, and the guide-lever will be held in its arrested position until the cam in its continued revolution again engages the roller. The further revolution of the cam will depress the lever to its lowest position, and as this occurs the pin 63 will engage the end of the lever 108, lifting the projection 106 and causing it to engage with the notch in the armature 109, as shown in Fig. 10, the magnet 105 having been de-energized to permit the retraction of the armature by spring 111 after the contact between the brush 115 and plate 113 has been broken by the passage of the hole in the card from under the brush. In this manner the parts are reset or restored to normal position ready to be again actuated by the next card which is delivered into the guide and thence into the compartment which corresponds with the index-point on the card. The operation just described is repeated continuously and with great rapidity until all the cards on the platform are sorted.

For the purpose of stopping the operation of the machine automatically when the supply of cards is exhausted I provide in the motor-circuit the normally closed contacts 71 and 72, which are actuated by the cam 65, arranged to revolve once for each delivery of a card and in such relation thereto that the cam separates these contacts momentarily while the advancing card is in engagement with a contact-actuating device or devices arranged in the path of the card in a branch circuit, through which the motor-circuit is opened and closed around the contacts 71 and 72. These contact devices which control the branch circuit around the contacts 71 and 72 are preferably two in number, for reasons to be presently explained, and each consists of the normally separated spring-contacts 140 and 141, suitably insulated and secured to the brackets 142 at each side of the machine, Figs. 3 and 10. The contacts are held apart by the spring-retained detents 145, pivotally secured to said brackets and in such position that the lower end of each detent will project into the path of the cards as they pass through the guides. The advancing card engaging the detent will move it to release the spring-contact 141, which will thus contact with the spring 140 and close the circuit to the motor through the branch until the card passes out of engagement with the detent. At the same time the motor-circuit through contacts 71 and 72 is broken by the cam 65. Hence when the cards are exhausted the motor will continue to operate after the last card is delivered until the revolution of the cam 65 breaks the circuit at the contacts 71 and 72, and as no card then engages the detents 145 the branch circuit also will be open, the apparatus will stop, and the motor-circuit will be permanently broken at the relay 20 by the retraction of the armature from the contact 122. At the beginning of the operation the key-switch 123 is held closed until the first card reaches the detents 145, for unless a card should be in engagement with the detents when the motor-circuit is first broken by the cam 65 the motor will stop. In so far as the automatic stopping of the machine is concerned one card-actuated device 140 141 would suffice; but with two arranged in series and in line with each other at opposite sides of the machine which must be operated simultaneously to close the circuit while the contacts 71 and 72 are open I insure the automatic stopping of the apparatus in case a card should by accident be fed to the guides askew, and thus prevent the blocking of the guides.

I have shown eleven card-sorting stations or compartments, while there are only ten index-point positions in any column on the record-card. This additional compartment is designated by the letter Z, and the top or longest guide of the series 96 communicates with it. The different parts of the apparatus are so adjusted that this top guide will be in position to receive a card when the ratchet end of the lever 99 is in its highest position, so that if in any card no index-point is punched in the column according to which the cards are being sorted, or if the contacts or devices controlled by the card fail to operate properly, the lever 99 will not be arrested by the operation of the magnet, but will rise into its highest position, where it will be held by the cam 59 until this card enters the top guide, through which it is carried to the compartment Z.

The registering or counting apparatus employed for compiling the items in groups I to L comprise a group or series of nine registering-counters for each column of each group of the record to be tabulated. In Fig. 1 I have illustrated two such groups of counters 150 and 151, connected for tabulating the items of weight in group I. These counters, the construction of which is well understood by those skilled in the art, are each actuated by an electromagnet independently connected with the line by a conductor which is common to all the counters, and each time the circuit is closed through any magnet one impulse is imparted thereby to the index-hand of that counter. For each group of counters is provided a series of insulated contacts 152 and 153. The contacts of each series are separately and successively connected to the counters of each group. Contact-arms 154 155, one for each group, are mounted upon a shaft arranged to revolve synchronously with the movement of the card-feeding mechanism by means of suitable connections—such, for example, as the gears and shaft shown in Fig. 4. The arm 154 passes over and contacts with the contacts 152, and the arm 155 passes over and contacts with the contacts 153 at each revolution. The arm 154 is electrically connected with the conducting-brush 160, and the arm 155 is similarly connected with the brush 161. The brushes 160 and 161 are similar to the brush 115, heretofore described, and are supported by the insulating-rod 116. As will be understood, they may be adjusted on their support so as to traverse any column of figures in groups I to L of the card, and it will also be apparent that when a group contains more than two columns of index-point positions one brush and one group of counters for each column will be employed. The movements of the arms 154 155 and of the card are so related that each arm will pass over the left-hand contact of its group or segment as the index-point position denoted by the numeral "9" is passing under the brush and will pass over the right-hand contact as the index-point position denoted by the numeral "1" is under the brush, so if, for instance, the index-point positions be punched in group I to denote "25" (the "2" in the tens and the "5" in the units column) when the hole in the units-column is under the brush the arms 154 and 155 will be in contact with the contacts marked 5 and the circuit will be closed through the brush 161, arm 155, contact 5 of group 153 and the coils of the magnet of the corresponding counter of the group 151 to give one impulse to the index-hand of the counter. As the card advances and the circuit is closed through the hole punched at "2" in the tens-column the contact-arms will be in contact with the contacts 2 of each group and the circuit will be closed through the brush 160, arm 154, contact 2 of group 152 and the coils of the magnet connected therewith, imparting one impulse to the index of the corresponding counter in group 150. The dials of the counters are suitably graduated, so that the number of impulses given to each counter-magnet may be read direct from the dials, and to obtain the total registration of the counters the reading of each dial is at the conclusion of the tabulation multiplied by the relative value of that particular counter. Thus the reading of the left-hand counter of group 150, one impulse of which represents ninety, is multiplied by ninety, the reading of the next counter by eighty, and so on, while in group 151. the left-hand counter reading is multiplied by nine, that of the next by eight, and so on, the products thus obtained being summarized to obtain the total of the tabulating operation.

Figure 12:
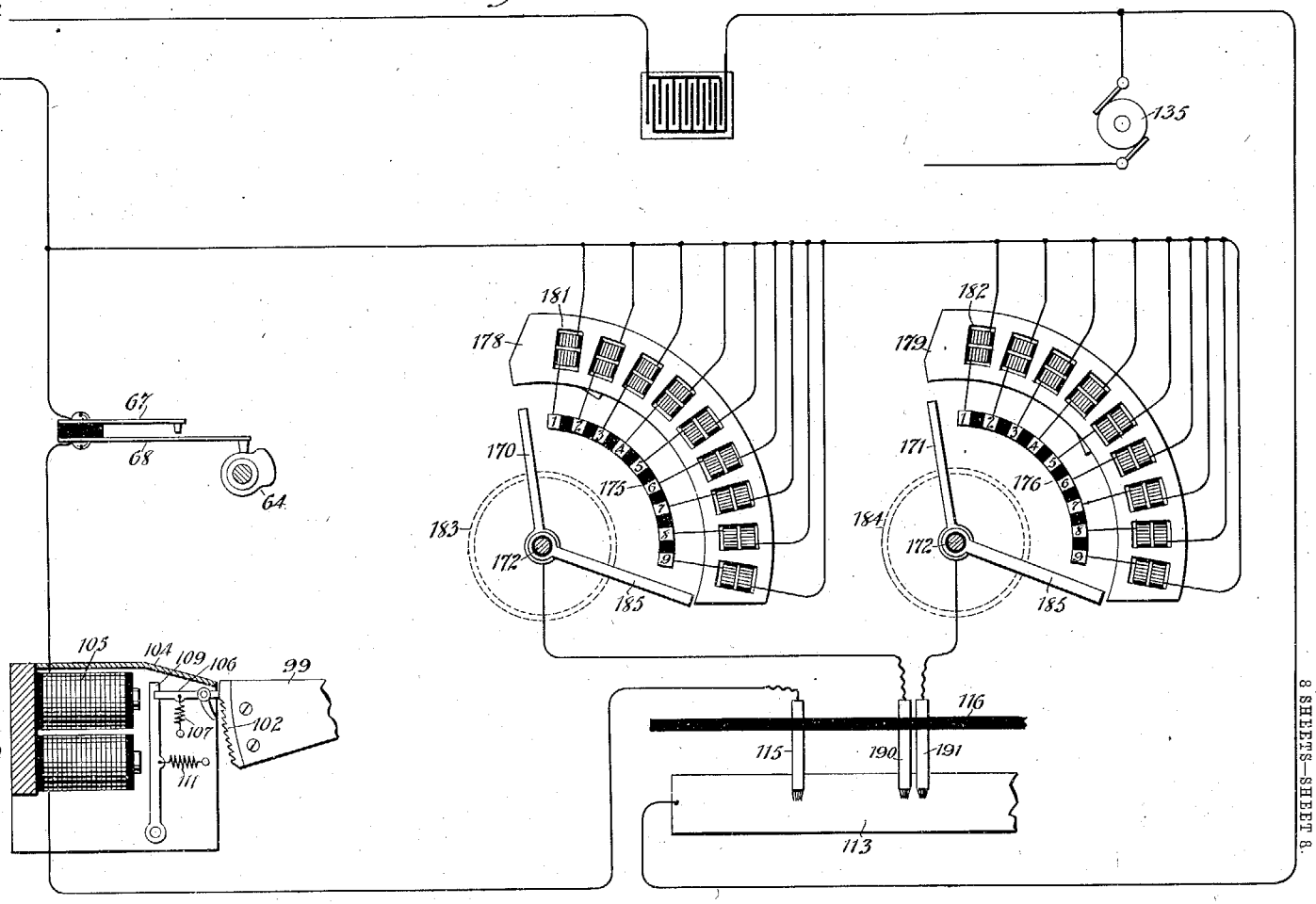

In Fig. 12 I have illustrated diagrammatically an arrangement of devices embodying the registers or counters illustrated, described, and claimed in my United States Letters Patent No. 677,214, dated June 25, 1901. In this arrangement contact-arms 170 171 are mounted on a shaft 172 and are arranged to make a complete revolution at each operation of the machine and in such revolution to pass over the contacts 175 176. Each register, as described in my said patent, comprises a plurality of sector-plates 178 179, each carrying a group or series of electromagnets 181 182, similar in construction and arrangement to the magnets designated by the number 78 in said patent, to which reference is made for a detailed description. One contact-arm and one series of contacts are provided for each series or group of magnets. Indicators 183 and 184, one for each series of magnets, are mounted loosely on the shaft 172. Arms 185 are journaled on the shaft 172 and carry the indicator-actuating mechanism, as described in said patent, said arms being suitably connected to oscillate the indicator-actuating mechanism back and forth in front of the magnets at each operation of the machine. The contact-arms are insulated from the shaft 172; but it will be understood that it is not necessary that the contact-arms 170 171 should be mounted on this shaft so long as the arms make a complete revolution in synchronism with the movement of the card at each operation of the machine. Each of the contacts of the segment 175 is connected with the corresponding magnet of the series 181, and the contacts 176 are similarly connected with the magnets of the series 182. Each magnet of each series is independently connected to a common return-wire. The arm 170 is electrically connected with the brush 190 and the arm 171 with the brush 191. When either of the brushes 190 191 contacts with the plate 113 through a hole punched in the card, the contact-arm connected with the brush will be in engagement with the contact which corresponds to said hole and the circuit will be closed through the corresponding magnet, releasing a pawl, which as the actuating mechanism is carried in front of the magnets will cause the actuating mechanism to engage its indicator, imparting to it an amount of movement corresponding to the index-point of the card. As will be understood, when using the apparatus illustrated in Fig. 12, the total results of the tabulation may be read directly from the indicator-wheels.

It is to be understood that a very wide departure may be made from the particular form and arrangement of the apparatus and devices herein described and illustrated without involving any departure from my invention, one particular feature of which is the operation of tabulating or sorting apparatus by means of a device such as a pair of electrical contacts, which are rendered operative at different points in the travel of the card, so that the operation of the apparatus will correspond with the position of the card relatively to that of the device controlled thereby.

It will be observed that one particular feature of my invention is the employment of a device, such as a pair of electrical contacts, rendered operative at different points in the travel of the record-card, so that the operation of the apparatus will correspond with the position of the card relatively to that of the device controlled thereby. It is also to be understood that other novel features of my present invention may be employed with other forms of controlling devices or contacts differently arranged and that my invention is not as to such other features necessarily restricted to the form or description of controlling devices or contacts illustrated in the drawings.

Having thus described my invention, what I claim as new, and desire to secure by Letters Patent, is—

1. In apparatus for tabulating and sorting records, the combination with one or more groups of registers, of a device controlled by the records for actuating the registers in accordance with the position of a record relatively to the device controlled thereby, and a similar device also controlled by a record for effecting the delivery of the records at different points in accordance with the position of the record relatively to the last-mentioned record-controlled device.

2. In apparatus for tabulating record-cards, the combination with one or more groups of registers, of a record-controlled device for variably actuating the registers in accordance with the position of a record relatively to the record-controlled device when the latter operates.

3. In apparatus for tabulating record-cards having index-point positions arranged in columns, the combination of registers corresponding to the index-point positions, and a record-controlled device, common to each column of index-point positions, for actuating the registers in accordance with the relative position of the record and the actuating device when the latter operates.

4. In apparatus for tabulating record-cards having index-point positions successively arranged in columns, the combination of registers, a record-controlled device for variably actuating the registers in accordance with the position of the operative index-point, and means for feeding the cards to present the index-point positions of a column successively to said actuating device.

5. In apparatus for sorting record-cards having index-point positions successively arranged in columns, the combination of sorting mechanism, a record-controlled device for actuating the same, and means for feeding the cards to present the index-point positions of a column successively to said actuating device.

6. In apparatus for tabulating record-cards having index-point positions successively arranged in columns, the combination of a series of register-controlling electromagnets for each column of index-point positions, a card-controlled circuit-closing device common to the magnets of each series, and means for feeding the cards to present the index-point positions of a column successively to the circuit-closing device.

7. In apparatus for tabulating record-cards, the combination of a plurality of register-controlling electromagnets, a card-controlled circuit-closing device for said magnets, means for feeding the cards to present their index-point positions successively to said device, and a circuit-closing mechanism movable in unison with the card for bringing the magnets into circuit successively.

8. In apparatus for sorting record-cards according to the location of index-points thereon, the combination with card-feeding means, of a plurality of relatively immovable delivery-guides, one for each index-point position, means for moving said guides at each operation of the machine, and means for varying the extent of such movement according to the location of the index-point.

9. In apparatus for sorting record-cards according to the location of index-points thereon, the combination with card-feeding means, of a plurality of delivery-guides, connected to move together, means common to all the guides for moving them relatively to the path of the card at each operation of the machine, and means for arresting the movement of the guides at a point determined by the location of the index-point on the card.

10. In apparatus for sorting record-cards the combination with card-feeding means, of a plurality of delivery-guides, means for oscillating said guides together at each operation of the machine, and means controlled by the index-point positions of the cards for arresting the movement of the guides at a point which will permit the delivery of the card which is in operative position to the guide which corresponds to the location of its index-point.

11. In apparatus for sorting record-cards the combination of a series of sorting-stations arranged in succession in the direction of movement of the cards, means for moving the cards in the direction of the sorting-stations, and means for terminating the movement of each card at a station, the distance of which from the operative position of the card is determined by the index-point thereon.

12. In apparatus for sorting record-cards the combination with card-feeding means, of a plurality of sorting-stations, and a traveling carrier which engages each card while moving from its operative position toward its station.

13. In apparatus for sorting record-cards, the combination with card-feeding means of a plurality of sorting-stations, means controlled by the card for determining which station shall receive the card, and a traveling carrier which engages each card while moving from its operative position toward such station.

14. In apparatus for sorting record-cards the combination of a plurality of card-receiving stations, guides leading from the operative position of the cards thereto, and mechanism moving along said guides to control the delivery of the cards to said stations.

15. In apparatus for sorting record-cards, the combination of sorting-stations arranged at progressively-increasing distances from the operative position of the cards, a plurality of movable guides, one for each station, of progressively-increasing length, and means controlled by the cards for moving a variable number of said guides across the path of movement of the cards to determine which guide shall receive the card.

16. In apparatus for sorting record-cards having index-point positions thereon, the combination with card-feeding means of card-sorting stations corresponding to the index-point positions on the cards, a plurality of relatively immovable guides of progressively-increasing length communicating with said stations and means for delivering each card to the guide which corresponds to the position of the index-point thereon.

17. In apparatus for sorting record-cards, the combination with card-feeding means, of a plurality of sorting-stations, guides communicating with said stations, means for delivering the cards to the guides, and means for engaging the cards to control their movement in the guides.

18. In apparatus for sorting record-cards, the combination with card-feeding means, of a plurality of sorting-stations, a card-guide for each station, means controlled by the card for determining which guide shall receive the card, and a device common to all the guides for controlling the movement of the cards therein.

19. In apparatus for sorting record-cards, the combination with card-feeding means, of a plurality of sorting-stations, guides communicating therewith, and a movable card-engaging device common to all the guides for controlling the movement of the cards in the guides.

20. In apparatus for sorting record-cards, the combination with card-feeding means, of a plurality of sorting-stations, guides communicating therewith and traveling fingers arranged to engage each card in its appropriate guide and control its movement therein.

21. In apparatus for sorting record-cards, the combination with card-feeding means, sorting-stations and guides, of mechanism for controlling the movement of the cards in the guides comprising an endless carrier, revoluble supports therefor and card-engaging fingers.

22. In apparatus for sorting record-cards, the combination with card-feeding means, sorting-stations and guides, of mechanism for controlling the movement of the cards in the guides, comprising an endless carrier, revoluble supports upon which the carrier is mounted, card-engaging fingers, and means for revolving said supports.

23. In apparatus for sorting record-cards, the combination with card-feeding means, of a plurality of sorting-stations, a plurality of card-receiving guides, a connecting device common to all the guides through which they are moved into receiving position, and card-controlled means for determining the movement of said connecting device.

24. In apparatus for sorting record-cards, the combination with card-feeding means, of a plurality of sorting-stations, a plurality of card-receiving guides corresponding to the stations, a connecting device common to all the guides through which they are moved into receiving position, means for actuating said connecting device and card-controlled means for arresting the movement thereof at a point determined by the index-point of the card.

25. In apparatus for sorting record-cards, the combination with card-feeding means, of a plurality of sorting-stations, guides and means common to all the guides and controlled by the record-cards for determining which guide shall receive the card.

26. In apparatus for sorting record-cards, the combination with card-feeding means, of a plurality of sorting-stations, card-receiving guides, and an electromagnet common to all the guides for determining which station shall receive the card.

27. In apparatus for sorting record-cards, the combination with a plurality of sorting-guides corresponding to the index-point positions on the cards, means for moving the card and guides in unison and means for arresting the movement of the guides as the index-point on each card reaches its controlling position.

28. In apparatus for sorting record-cards, the combination with a plurality of sorting-guides corresponding to the index-point positions on the cards, means for moving the cards and guides in unison, and means comprising an electromagnet for arresting the movement of the guides as the index-point on each card reaches its controlling position.

29. In apparatus for sorting record-cards, the combination of sorting-guides corresponding to the index-point positions on the cards, a circuit-controlling device common to all the index-points of each column, means for feeding the cards and moving the guides in unison, and means for arresting the movement of the guides as the index-point reaches its controlling position.

30. In apparatus for sorting record-cards, the combination of sorting-guides corresponding to the index-point positions on the cards, a circuit-controlling device common to all the index-point positions of each column, means for adjusting said device in operative position for any column on the card, and means controlled by said device for delivering each card to its proper sorting-station.

31. In apparatus for sorting record-cards, the combination with card-feeding means, of a plurality of guides corresponding to the index-point positions on the cards, means for moving said guides relatively to the path of the cards, an engaging device for arresting the movement of the guides, and means, such as an electromagnet, controlled by each card, for actuating the engaging device, when the guides are in a position which corresponds to the index-point on the card.

32. In apparatus for sorting record-cards, the combination with feeding and delivering mechanism, of a card-controlled electric circuit comprising normally closed contacts which are separated by the passage of the cards between them, and means controlled by said contacts for sorting the cards into groups.

33. In apparatus for sorting record-cards, the combination with feeding and delivering mechanism of a card-controlled electric circuit having a fixed contact common to a plurality of the columns of index-point positions on the card, and a contact which is adjustable along the fixed contact to bring it into operative relation with any one of said columns.

34. In apparatus for sorting record-cards, the combination with card-feeding means, of a plurality of sorting-stations, a card-receiving guide for each station, an operating connection common to all the guides, an electromagnet for controlling the movement of said connection, and a circuit-controlling device for said magnet under the control of the card.

35. In apparatus for sorting record-cards according to the location of an index-point thereon, the combination with card feeding and delivering means of mechanism variably controlled by a record-controlled device common to the index-point positions of each column, for effecting the proper delivery of the cards.

36. In apparatus for sorting record-cards, the combination of a plurality of sorting-stations, a single record-controlled device common to a plurality of the stations and means for effecting the delivery of each card at a station which is determined by the relative positions of the card and the record-controlled device when the latter operates.

37. In apparatus for sorting record-cards, the combination of a single circuit-controlling device common to a plurality of the index-point positions in any group of the record-cards, and means for effecting the delivery of each card at a point which is determined by the relative positions of the card and the circuit-controlling device when the latter operates.

38. In apparatus for sorting record-cards, the combination of a plurality of sorting-stations, a card-controlled device common to all the stations, and means controlled thereby for effecting the delivery of a card at a station which is determined by the relative positions of the card and the card-controlled device when the latter operates.

39. In apparatus for sorting record-cards, the combination with card feeding and delivering means, an operating-circuit which includes an electric motor and contacts controlled by the motor for breaking the circuit at a predetermined point in the movement of the cards, and circuit-closing devices actuated by the movement of the card for closing the operating-circuit around the motor-controlled contacts when the card is in said predetermined position.

40. In apparatus for sorting record-cards, the combination with card feeding and delivering means, of a contact in the motor-circuit actuated by the motor to break the circuit when a card is in a predetermined position and two circuit-closing devices in series arranged to be actuated simultaneously by the movement of the card to close the motor-circuit around the motor-actuated contact when the card is in said predetermined position.

41. In apparatus for sorting record-cards, the combination with card feeding and delivering means and an operating-motor, of an electric circuit, contacts therein controlled by the cards, and devices actuated by the motor for breaking the circuit at another point after each card has passed its operating position.

42. In apparatus for tabulating record-cards, the combination with a record-card having index-point positions arranged in columns, each index-point position of a column representing a different characteristic or amount, of registering mechanism, a record-controlled device which is common to all the index-point positions of a column, means for presenting the index-point positions of a column successively to their record-controlled device and means controlled by the record-controlled device for variably actuating the registering mechanism in accordance with the position of a record relatively to the record-controlled device when the latter operates.

43. In apparatus of the character described the combination with a record-card having index-point positions, a contact device controlled by the record and common to a plurality of index-point positions, means for feeding the record-card to present the index-point positions of a column successively to their contact device, registering members controlled by said contact device and means for imparting a variable movement to the registering members in accordance with the relative position of the record-card and said contact device when the latter operates.

44. In apparatus of the character described the combination with a record-card having index-point positions arranged in columns, contact devices each of which is common to all the index-point positions of a column, means for relatively moving the record-card and contact device to present the index-point positions of a column successively to their contact device, register mechanism comprising a plurality of movable registering members or indicators, each of which is controlled through a single contact device and means for variably moving the registering or indicating members, the extent of such movement being determined by the location of the operating index-point in its column.

45. In apparatus of the character described the combination with a record-card having index-point positions arranged in columns, each position of a column representing a different characteristic or amount, record-controlled devices each of which is common to all the index-point positions of a column, means for relatively moving the record-card and the record-controlled devices to present the index-point positions of a column successively to its record-controlled device, register mechanism comprising a plurality of members or indicators each corresponding to a column of index-point positions and movable into different positions and means controlled by the record-controlled devices for moving each register member or indicator into a position which corresponds with the location of the operating index-point in its column.

46. In apparatus of the character described the combination of a motor, registering members or indicators, a record-card having index-point positions, means for moving the record-card in unison with the motor, a record-controlled device common to a plurality of index-point positions for effecting the connection of each registering member or indicator with the motor and means for maintaining such connection for a variable period the length of which is determined by the location of the operating index-point.

47. In apparatus of the character described the combination of a motor, registering members or indicators, a record-card having index-points, contact devices which are operated by the record-card at different points in its movement, means for moving the record-card between said contacts in unison with the motor, means comprising electromagnets controlled by the contact devices for separately connecting each registering member or indicator with the motor and means for maintaining such connection for a variable period the length of which is determined by the location of the operating index-point.

HERMAN HOLLERITH.

Witnesses:

CLARENCE E. LATIMER,
FRANCES PEYTON SMITH.